(12) United States Patent
Chen et al.

(10) Patent No.: US 12,361,528 B2
(45) Date of Patent: Jul. 15, 2025

(54) IMAGE QUALITY ANALYSIS FOR ARTIFACT DETECTION IN PATHOLOGY SLIDE IMAGES

(71) Applicant: Genentech, Inc., South San Francisco, CA (US)

(72) Inventors: Bingyuan Chen, South San Francisco, CA (US); Sertan Kaya, South San Francisco, CA (US); Chetan Madhavarao Kulkarni, South San Francisco, CA (US)

(73) Assignee: GENENTECH, INC., South San Francisco, CA (US)

( * ) Notice: Subject to any disclaimer, the term of this patent is extended or adjusted under 35 U.S.C. 154(b) by 413 days.

(21) Appl. No.: 17/705,477

(22) Filed: Mar. 28, 2022

(65) Prior Publication Data

US 2022/0318979 A1 Oct. 6, 2022

Related U.S. Application Data

(60) Provisional application No. 63/170,028, filed on Apr. 2, 2021.

(51) Int. Cl.
*G06T 7/00* (2017.01)
*G06T 5/50* (2006.01)
*G06T 7/40* (2017.01)

(52) U.S. Cl.
CPC .............. *G06T 7/0002* (2013.01); *G06T 5/50* (2013.01); *G06T 7/40* (2013.01); *G06T 2207/30168* (2013.01)

(58) Field of Classification Search
CPC ........... G06T 7/0002; G06T 5/50; G06T 7/40; G06T 2207/30168; G06T 2207/10056; G06T 2207/20021; G06T 7/0012
See application file for complete search history.

(56) References Cited

U.S. PATENT DOCUMENTS

2012/0275671 A1\* 11/2012 Eichhorn ............... H04N 19/60
382/128
2018/0012352 A1\* 1/2018 Pham ....................... G06T 7/13
(Continued)

OTHER PUBLICATIONS

X. Yi and M. Eramian, "LBP-Based Segmentation of Defocus Blur," in IEEE Transactions on Image Processing, vol. 25, No. 4, pp. 1626-1638, Apr. 2016, doi: 10.1109/TIP.2016.2528042 (Year: 2016).\*
(Continued)

*Primary Examiner* — Matthew C Bella
*Assistant Examiner* — Janice E. Vaz
(74) *Attorney, Agent, or Firm* — Kilpatrick Townsend & Stockton LLP (57) ABSTRACT

Systems and methods relate to processing digital-pathology images. More specifically, aspects of the present disclosure are directed to accessing a whole-slide image depicting a slice of specimen, defining a set of tiles within at least part of the whole-slide image, generating one or more artifact prediction metrics by applying artifact detection to each tile of the set of tiles, wherein each of the one or more artifact prediction metrics corresponds to a predicted level of image quality of part or all of the whole-slide image, generating a quality heat map image corresponding to the whole-slide image, wherein the quality heat map image is based on the one or more artifact prediction metrics, and outputting the quality heat map image.

20 Claims, 6 Drawing Sheets

(56) References Cited

U.S. PATENT DOCUMENTS

| | | | | |
|---|---|---|---|---|
| 2019/0197362 | A1* | 6/2019 | Campanella | G06V 10/30 |
| 2022/0058839 | A1* | 2/2022 | Chang | G06N 3/047 |
| 2023/0206416 | A1* | 6/2023 | Maier | G06V 10/25 |
| | | | | 382/254 |

OTHER PUBLICATIONS

M. Dinesh Kumar, M. Babaie, S. Zhu, S. Kalra and H. R. Tizhoosh, "A comparative study of CNN, BoVW and LBP for classification of histopathological images," 2017 IEEE Symposium Series on Computational Intelligence (SSCI), Honolulu, Hi, USA, 2017, pp. 1-7, doi: 10.1109/SSCI.2017.8285162, (Year: 2017).*

Walkowski S, Szymas J. Quality evaluation of virtual slides using methods based on comparing common image areas. Diagnostic pathology. 2011; 6(1):S14, pp. 1-7.

Haralick RM, Shanmugam K. Textural features for image classification. IEEE Transactions on systems, man, and cybernetics. 1973; 3(6):610-621.

Zerbe N, Hufnagl P, Schluns K. Distributed computing in image analysis using open source frameworks and application to image sharpness assessment of histological whole slide images. Diagnostic pathology. 2011; 6(1):S16, pp. 1-5.

Jay Martin Tenenbaum, Accommodation in computer vision. DTIC Document, 1970, all pages.

Hashimoto N, Bautista PA, Yamaguchi M, Ohyama N, Yagi Y. Referenceless image quality evaluation for whole slide imaging. J Pathol Inform. 2012, all pages.

Moles Lopez X, D'Andrea E, Barbot P, Bridoux A-S, Rorive S, Salmon I, et al. (2013) An Automated Blur Detection Method for Histological Whole Slide Imaging. PLoS One 8(12): e82710. https://doi.org/10.1371/journal.pone.0082710, all pages.

Senaras C, Niazi MKK, Lozanski G, Gurcan MN. DeepFocus: detection of out-of-focus regions in whole slide digital images using deep learning. PLoS One. 2018;13(10):e0205387. https://doi.org/10.1371/journal.pone.0205387, all pages.

M. Abadi, A. Agarwal et al., "Tensorflow: Large-scale machine learning on heterogeneous distributed systems," arXiv: 1603.04467, 2016, all pages.

Hosseini MS, Brawley-Hayes JA, Zhang Y, Chan L, Plataniotis K, Damaskinos S. Focus quality assessment of high-throughput whole slide imaging in digital pathology. IEEE Trans Med Imaging. 2020;39: pp. 62-74.

"HistoQC: An Open-Source Quality Control Tool for Digital Pathology Slides", Janowczyk A., Zuo R., Gilmore H., Feldman M., Madabhushi A., Jco Clinical Cancer Informatics, 2019, all pages.

Kumar, Meghana & Babaie, Morteza & Zhu, Shujin & Kalra, Shivam & Tizhoosh, Hamid. (2017). A Comparative Study of CNN, BoVW and LBP for Classification of Histopathological Images, all pages.

Yi, Xin, and Mark Eramian. "LBP-based segmentation of defocus blur." IEEE transactions on image processing 25.4 (2016): pp. 1626-1638.

DC. He and L. Wang (1990), "Texture Unit, Texture Spectrum, and Texture Analysis", Geoscience and Remote Sensing, IEEE Transactions on, vol. 28, pp. 509-512.

L. Wang and DC. He (1990), "Texture Classification Using Texture Spectrum", Pattern Recognition, vol. 23, No. 8, pp. 905-910.

Ali, U.; Mahmood, M.T. Analysis of Blur Measure Operators for Single Image Blur Segmentation. Applied Sciences, 2018, pp. 1-32.

Unay D, Ekin A. Intensity versus texture for medical image search and retrieval. In: Proceedings of the 5th IEEE international symposium on biomedical imaging: from nano to macro (ISBI 2008); 2008. pp. 241-244.

* cited by examiner

IMAGE QUALITY ANALYSIS FOR ARTIFACT DETECTION IN PATHOLOGY SLIDE IMAGES

CROSS-REFERENCES TO RELATED APPLICATIONS

The application claims the benefit of and the priority to U.S. Provisional Application No. 63/170,028, filed on Apr. 2, 2021, which is hereby incorporated by reference in its entirety for all purposes.

BACKGROUND

Digital images are increasingly used in the medical context to (for example) facilitate clinical assessments (e.g., diagnoses, prognoses, treatment selections, and treatment evaluations). Image processing can be performed to estimate whether a given image includes any depiction(s) of a particular type of biological object. For example, a section of a tissue sample may be stained such that depictions of objects of a particular type (e.g., a particular type of cell, a particular type of cell organelle or blood vessels) preferentially absorb the stain and are thus depicted with a higher intensity of a particular color. The image can then be processed to detect depictions of objects of the particular type. In some instances, a clinical assessment is made based on whether a depiction of particular type of object was observed and/or a quantity of depictions of one or more particular types of objects.

However, a digital image may include artifacts (e.g., blur, tissue folds, pen marks, air bubbles) that may interfere with analysis and assessment of the image. Thus, it would be advantageous to identify a technique that processes images to generate an output of a predicted level of image quality that can be used to identify artifacts in digital images.

SUMMARY

In some embodiments, a computer-implemented method is provided. A whole-slide image depicting a slice of specimen is accessed. The whole-slide image can include a grayscale image. A set of tiles is defined within at least part of the whole-slide image. Each tile of the set of tiles can include a predefined number of pixels. One or more artifact prediction metrics are generated by applying artifact detection to each tile of the set of tiles. The one or more artifact prediction metrics correspond to a predicted level of image quality of part or all of the whole-slide image. A quality heat map image is generated that corresponds to the whole-slide image by stitching the tiles of the set of tiles together. The quality heat map image is based on the one or more artifact prediction metrics. For example, a color range used by the quality heat map can represent the one or more artifact prediction metrics. The quality heat map image is output.

In some embodiments, the artifact detection includes generating a feature data structure by processing the whole-slide image using a texture descriptor algorithm. For example, the texture descriptor algorithm can be a local binary pattern (LBP) algorithm. The texture descriptor algorithm can define a set of regions within at least part of the whole-slide image. Each region can include a center pixel and multiple surrounding pixels. A local-pattern value that represents relative differences between intensities of pixels within the region is generated for each region of the set of regions. Generating the local-pattern values can include generating a pixel-comparison value for each surrounding pixel of the multiple surrounding pixels in the region that indicates whether an intensity of the surrounding pixel is greater than an intensity of the center pixel in the region and generating a binary number for the region based on the pixel-comparison values. The one or more artifact prediction metrics are generated for the whole-slide image based on the local-pattern values.

In some embodiments, the computer-implemented method can include determining one or more tiles of the whole-slide image to further process based on the one or more artifact prediction metrics associated with the set of tiles. Additionally or alternatively, the computer-implemented method can include determining a particular artifact prediction metric of the one or more artifact prediction metrics corresponds to a predicted level of image quality below a predefined amount, determining a number of pixels of the whole-slide image that include the particular artifact prediction metric exceeds a predefined limit, and discarding or rescanning the whole-slide image.

In some embodiments, the computer-implemented method can include determining a particular artifact prediction metric of the one or more artifact prediction metrics corresponds to a predicted level of image quality greater than a predefined amount and determining a number of pixels of one or more tiles of the set of tiles that include the particular artifact prediction metric exceeds a predefined limit. The one or more tiles can be further processed to determine one or more characteristics of the slice of specimen.

In some embodiments, the computer-implemented method can include determining an amount of each tile of the set of tiles that depicts at least some of the slice of specimen. It can be determined, for each tile of the set of tiles, whether the amount of the tile exceeds a predefined threshold. Tiles of the set of tiles for which the amount of the tile exceeds a predefined threshold can be filtered into a subset of tiles. The feature data structure can be generated from the subset of tiles.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes techniques for automated artifact identification in digital pathology images. More specifically, some embodiments of the present disclosure provide techniques for identifying a level of image quality of whole-slide images to support or improve digital pathology analysis.

Whole-slide images may be used in the study of different types of cells in biological tissue, blood, or urine. For a tissue sample, a biopsy of the biological tissue may be collected, fixed (e.g., using a formaldehyde solution) and embedded. Then the sample may be sliced into smaller sections, and each slice can be positioned on a glass slide for staining and analysis. For a liquid sample (e.g., blood or urine), a drop (or multiple drops) of the sample can be placed on a base slide, and a spreader slide can be placed on top of the sample so as to smear the sample. The slide can then be dried (e.g., air dried), fixed (e.g., using methanol) and stained.

Artifacts may be introduced during preparation or digitization of the slide. For example, a tissue fold or air bubble may occur during preparation of the slide. A slide may also or alternatively include a pen mark from a pathologist. Additionally, digitization of the slide may result in regions of the whole-slide image being out of focus. These artifacts may affect the quality of analysis of the whole-slide image. For example, a region including an artifact may be incorrectly identified as being (or not being) an area of interest (e.g., tumor cells) in the whole-slide image. A pathologist may manually review each whole-slide image to identify artifacts and rescan whole-slide images that include artifacts. This identification may be subject to error, and can be time intensive when a large number of slides is to be processed. Thus, automated identification of artifacts in whole-slide images may provide more accurate and fast detection of artifacts, which may be used to filter out at least some images or portions of images with artifacts from an image data set being analyzed. This filtering can result in more efficient and better analysis of the samples. The automated identification of artifacts may also make downstream digital pathology analyses more efficient by permitting removal of portions of whole-slide images that may contain artifacts or otherwise compromised images. Training machine learning to provide digital pathology analyses may require large quantities of data. Usable data is often rare or difficult to come by, as scanning techniques may be inconsistent and irregular, and artifacts are often introduced in the process of generating whole-slide images. Current digital pathology analyses often entail use of whole-slide images. The presently described embodiments allow forward analysis of portions (e.g., tiles) of a whole-slide image that are free of artifacts. Such image-portion or file-based analysis may enable more expansive digital pathology analysis by providing more usable data. Rather than the current practice of removing a whole-slide image from analysis due to an artifact, the present embodiments may salvage the usable parts of an image for future analyses by distinguishing portions of an image that contain artifacts, from artifact-free portions of an image.

In some embodiments, a whole-slide image is segmented into tiles of a predefined number of pixels. For example, each tile can be a 4×4 square of pixels. Artifact detection is applied to each tile to identify artifacts in the whole-slide image. The artifact detection can include using a texture descriptor algorithm, or other deep learning algorithms, to generate artifact prediction metrics in a whole-slide image. In some instances, the texture descriptor algorithm may be a local binary pattern (LBP) algorithm to automatically generate artifact prediction metrics in whole-slide images. The texture descriptor algorithm can generate a feature data structure of local-pattern values that each correspond to a region of the whole-slide image. The local-pattern values can represent relative differences between intensities of pixels within the region. The texture descriptor algorithm may use the local-pattern values to generate the artifact prediction metrics for the whole-slide image. The artifact prediction metrics can correspond to a predicted level of image quality for some or all of the whole-slide image. For example, a particular artifact prediction metric may correspond to a low image quality for a region. An artifact prediction metric and corresponding image quality may additionally represent a presence of an artifact. In some instances, the texture descriptor algorithm is performed as part of pre-processing before performing an image analysis algorithm to classify target regions within the image (e.g., tumor cells). However, as should be understood by one of ordinary skill in the art, the concepts discussed herein are not limited to pre-processing procedures, but may also be integrated into the overall image analysis processing in accordance with various embodiments.

An output can be generated that indicates the predicted level of image quality of part or all of the whole-slide image. The output may be a quality heat map image generated using the local-pattern values. The quality heat map image can use a color range to represent the artifact prediction metrics. For example, a particular color can correspond to a particular level of image quality. Subsequent digital pathology processing can be configured based on the artifact prediction metrics. For example, one or more portions of the whole-slide image may be identified for further processing based on the artifact prediction metrics associated with the regions. The further processing may involve iteratively sharpening the one or more tiles until an artifact prediction metric associated with the portions reaches a threshold. Additionally or alternatively, a condition may be evaluated to determine whether to exclude the whole-slide image from subsequent image processing based on artifact prediction metrics. Evaluating the condition may include determining a quantity or portions of regions or tiles in an image are associated with an artifact prediction metric that is above a metric threshold and then determining whether the quantity exceeds a predefined limit. When it is determined that the condition is satisfied (i.e., the quantity exceeds the predefined limit), the image may be discarded. Additionally or alternatively, determining the condition is satisfied may trigger rescanning the slide or transmitting a request to rescan the slide.

II. Example Interaction System

Figure 1:
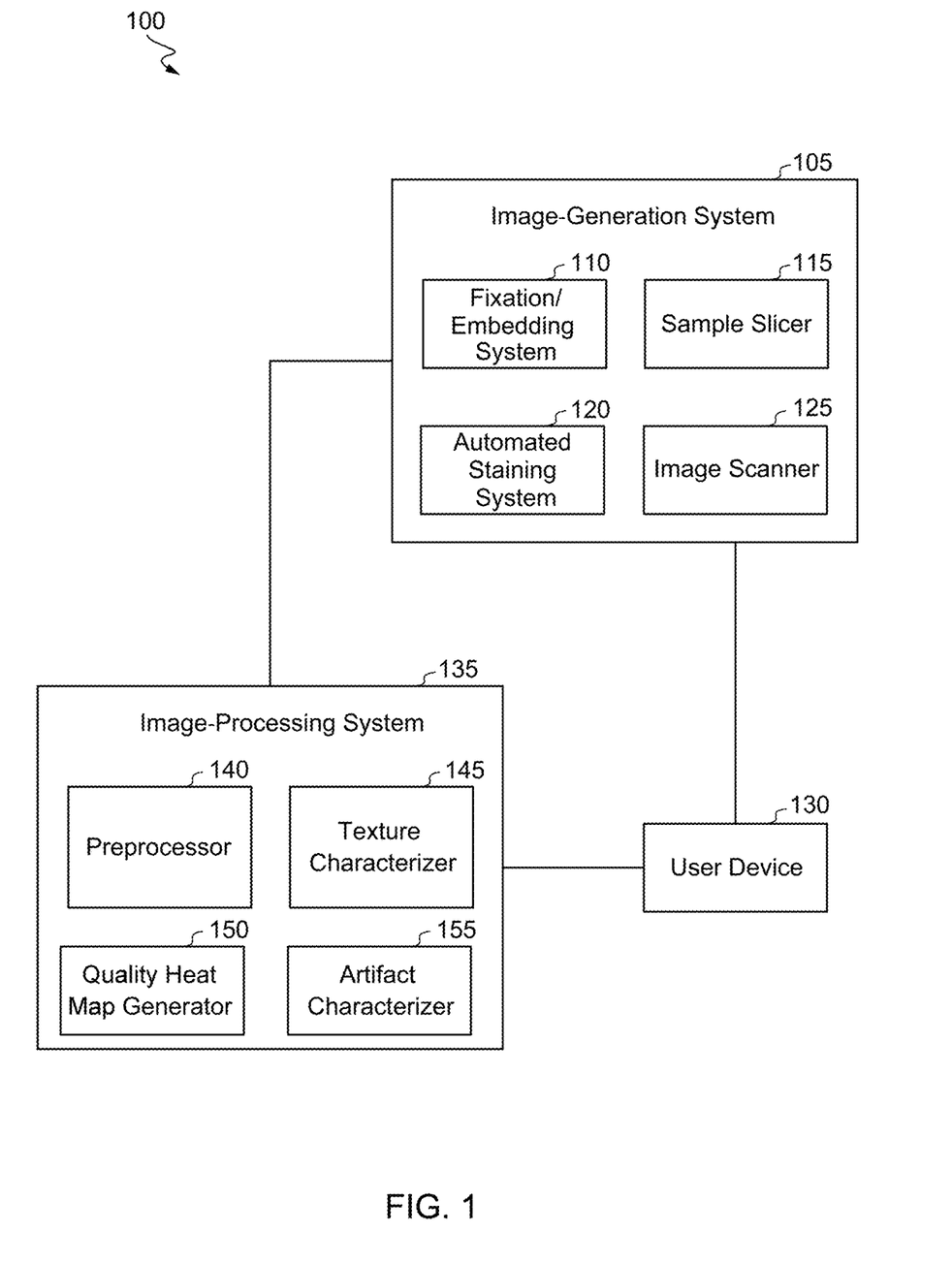
FIG. 1 shows an interaction system for generating and processing digital-pathology images to characterize image quality according to some embodiments.

FIG. 1 shows a network 100 for generating and processing digital pathology images (e.g., to detect depictions of particular types of biological objects). Network 100 may be configured to preprocess digital pathology images to assess image quality, to potentially modify (e.g., enhance) part or all of one or more images responsive to a quality assessment, and/or to potentially cause part or all of one or more images to not be further processed.

An image-generation system 105 can be configured to generate one or more digital images corresponding to a particular sample. For example, an image generated by image-generation system 105 can include a stained section of a biopsy sample. As another example, an image generated by image-generation system 105 can include a slide image (e.g., a blood film) of a liquid sample.

Some types of samples (e.g., biopsies, solid samples, and/or samples including tissue) can be processed by a fixation/embedding system 110 to fix and/or embed the sample. Fixation/embedding system 110 can be configured to facilitate infiltrating the sample with a fixating agent (e.g., liquid fixing agent, such as a formaldehyde solution) and/or embedding substance (e.g., a histological wax). For example, a fixation sub-system can fixate a sample by exposing the sample to a fixating agent for at least a threshold amount of time (e.g., at least 3 hours, at least 6 hours, or at least 12 hours). A dehydration sub-system can dehydrate the sample (e.g., by exposing the fixed sample and/or a portion of the fixed sample to one or more ethanol solutions) and potentially clear the dehydrated sample using a clearing intermediate agent (e.g., that includes ethanol and a histological wax). An embedding sub-system can infiltrate the sample (e.g., one or more times for corresponding predefined time periods) with a heated (e.g., and thus liquid) histological wax. The histological wax can include a paraffin wax and potentially one or more resins (e.g., styrene or polyethylene). The sample and wax can then be cooled, and the wax-infiltrated sample can then be blocked out.

A sample slicer 115 can receive the fixed and embedded sample and can produce a set of sections. Sample slicer 115 can expose the fixed and embedded sample to cool or cold temperatures. Sample slicer 115 can then cut the chilled sample (or a trimmed version thereof) to produce a set of sections. Each section may have a thickness that is (for example) less than 100 µm, less than 50 µm, less than 10 µm or less than 5 µm. Each section may have a thickness that is (for example) greater than 0.1 µm, greater than 1 µm, greater than 2 µm or greater than 4 µm. The cutting of the chilled sample may be performed in a warm water bath (e.g., at a temperature of at least 30° C., at least 35° C. or at least 40° C.).

An automated staining system 120 can facilitate staining one or more of the sample sections by exposing each section to one or more staining agents. Each section may be exposed to a predefined volume of staining agent for a predefined period of time. In some instances, a single section is concurrently or sequentially exposed to multiple staining agents.

Each of one or more stained sections can be presented to an image scanner 125, which can capture a digital image of the section. Image scanner 125 can include a microscope camera. Image scanner 125 may be further configured to capture annotations and/or morphometrics identified by a human operator. In some instances, a section is returned to automated staining system 120 after one or more images are captured, such that the section can be washed, exposed to one or more other stains, and imaged again. When multiple stains are used, the stains may be selected to have different color profiles, such that a first region of an image corresponding to a first section portion that absorbed a large amount of a first stain can be distinguished from a second region of the image (or a different image) corresponding to a second section portion that absorbed a large amount of a second stain.

It will be appreciated that one or more components of image-generation system 105 may, in some instances, operate in connection with human operators. For example, human operators may move the sample across various sub-systems (e.g., of fixation/embedding system 110 or of image-generation system 105) and/or initiate or terminate operation of one or more sub-systems, systems or components of image-generation system 105. As another example, part or all of one or more components of image-generation system (e.g., one or more sub-systems of fixation/embedding system 110) may be partly or entirely replaced with actions of a human operator.

Further, it will be appreciated that, while various described and depicted functions and components of image-generation system 105 pertain to processing of a solid and/or biopsy sample, other embodiments can relate to a liquid sample (e.g., a blood sample). For example, image-generation system 105 may be configured to receive a liquid-sample (e.g., blood or urine) slide that includes a base slide, smeared liquid sample, and cover. Image scanner 125 can then capture an image of the sample slide.

A given sample may be associated with one or more users (e.g., one or more physicians, laboratory technicians, and/or medical providers). An associated user can include a person who ordered a test or biopsy that produced a sample being imaged and/or a person with permission to receive results of a test or biopsy. For example, a user can correspond to a physician or a subject (from whom a sample was taken) him/herself. A user can use one or more user devices 130 to (for example) initially submit one or more requests (e.g., that identify a subject) that a sample be processed by image-generation system 105 and that a resulting image be processed by an image-processing system 135.

Thus, in some instances, image-generation system 105 transmits an image produced by image scanner 125 back to user device 130, and user device 130 communicates with image-processing system 135 to initiate automated processing of the image. In some instances, image-generation system 105 avails an image produced by image scanner 125 to image-processing system 135 directly.

Image-processing system 135 can be configured to generate artifact prediction metrics of an image. A preprocessor 140 can be configured to receive and preprocess the image from the image-generation system 105. For example, the preprocessor 140 may define a set of tiles within at least a part of the whole-slide image. Each of the tiles can be a predefined size (e.g., 4×4 pixels) and magnification (e.g., 20× or 40×). For example, a whole-slide image that is 48 pixels by 72 pixels, for a total of 3,456 pixels, can be separated into 216 tiles that are each 4 pixels by 4 pixels.

In some instances, the preprocessor 140 may filter tiles of the set of tiles. The filtering can involve the preprocessor 140 determining an amount of each tile that depicts at least some of the slice of specimen. For example, the preprocessor 140 may determine a percentage of the tile that depicts the slice of specimen. The preprocessor 140 can determine whether the amount of the tile that depicts at least part of slice of specimen exceeds a predefined threshold (e.g., 10%). Portions of a tile that do not depict the slice of specimen may be a particular color (e.g., white), so the preprocessor 140 can perform image analysis to determine a percentage of each tile that is the particular color. The tiles that include an amount exceeding the predefined threshold can be filtered into a subset of tiles. For example, the tiles for which more than 10% of the tile depicts the slice of specimen can be filtered into the subset of tiles. Tiles in the set of tiles that do not meet the predefined threshold can be excluded from the subset of tiles. The subset of tiles may be stored for further use by the image-processing system 135.

In some instances, the preprocessor 140 may additionally convert the image to grayscale. The whole-slide image may be converted to grayscale, or the subset of tiles that depict greater than the predefined threshold of the slice of specimen may be converted to grayscale. Converting part or all of the image to grayscale can normalize pixel values of the image, which may be beneficial in generating artifact prediction metrics for the image. Additionally or alternatively, a normalization or standardization may be performed separately from any grayscaling.

In some instances, the grayscale image (or tiles) is further processed by a texture characterizer 145 of the image-processing system 135. The texture characterizer 145 may generate artifact prediction metrics corresponding to a predicted level of image quality in part or all of the whole-slide image. For example, the texture characterizer 145 can use a texture descriptor algorithm (e.g., an LBP algorithm or other texture-based algorithm) to generate a feature data structure for some or all of the whole-slide image. The texture descriptor algorithm can involve defining a set of regions within at least part of the whole-slide image. Each region can include a center pixel and multiple surrounding pixels. Regions may overlap such that a center pixel of a first region is a surrounding pixel of a second region. The regions may be (but need not be) defined within each tile of the subset of tiles. For each region, a number of points (p) in a circularly symmetric region around the center pixel to consider in generating the feature data structure can be predefined. Additionally, a radius of the circle (r) from the center pixel can be predefined for each region. Values of eight for p and one for r can be determined by interpolation and result in a circular chain of points. These hyperparameters can remove the need for square regions since any number of surrounding pixels may be used for any radius size. Additionally, these hyperparameters allow different scales to be accounted for during analysis because the number of comparison points and the distance from the center pixel can be varied. For example, each region can be defined as a 3×3 square of pixels, and the texture descriptor algorithm can use hyperparameters p=8 and r=1.

The texture descriptor algorithm can generate a local-pattern value for each region. The local-pattern value can represent relative differences between intensities of pixels within the region. A pixel-comparison value can be generated for each surrounding pixel of the multiple surrounding pixels in the region. The pixel-comparison value can indicate whether an intensity of the surrounding pixel is greater than an intensity of the center pixel in the region. For hyperparameters p=8 and r=1, the intensity values for the surrounding pixels that are adjacent to the center pixel are the intensity at the center of the corresponding surrounding pixel. However, the intensity values for points of the surrounding pixels that are diagonal from the center pixel can be interpolated from the intensity values of those surrounding pixels. The texture characterizer 145 may use bilinear interpolation, or any other two-dimensional interpolation technique to determine the intensity values. For example, the center pixel can have an intensity of 5 and the surrounding pixels, beginning at a top right position in relation to the center pixel and moving clockwise, can have intensities of 1, 2, 2, 6, 2, 5, 6, and 8, respectively. The pixel-comparison values can be zeros and ones that are generated by comparing the center pixel intensity to each of the surrounding pixel intensities. For example, a surrounding pixel having an intensity less than the center pixel can result in a pixel-comparison value of one, and a surrounding pixel having an intensity greater-than-or-equal to the intensity of the center pixel can result in a pixel-comparison value of zero. Therefore, starting from the top right pixel compared to the center pixel and moving clockwise, the pixel-comparison values can be 1, 1, 1, 0, 1, 0, and 0, respectively.

The texture characterizer 145 can then generate a binary number for the region based on the pixel-comparison values. Any surrounding pixel may be used as the starting point for generating the binary number as long as the ordering and direction (e.g., clockwise or counterclockwise) remain consistent for each pixel in the whole-slide image. For example, starting from the top right pixel, the binary number for the region is 0010111. The local-pattern value can be the decimal equivalent of the binary number. Thus, in the example, the local-pattern value can be 23. The local-pattern value can be stored in the feature data structure, which may be a two-dimensional array with the same width and height as the input image.

The local-pattern values may be represented as a histogram showing the distribution of local-pattern values in some or all of the whole-slide image. The x-axis of the histogram represents the binary numbers or the decimal equivalents. The y-axis represents the frequency of the binary number (or decimal equivalent) in some or all of the whole-slide image.

In some instances, the texture characterizer 145 can generate one or more artifact prediction metrics for some or all of the whole-slide image based on the local-pattern values. The one or more artifact prediction metrics may be determined for each pixel, each tile, and/or the whole-slide image. For regions that overlap, an artifact prediction metric can be associated with a center pixel of the regions. For any non-overlapping regions, the artifact prediction metric can be associated with all pixels of the regions. Each local-pattern value can correspond to a level of image quality for the corresponding region. A high artifact prediction metric may correspond to a low image quality. The level of image quality may be a percentage, with 100% representing the highest image quality and 0% representing the lowest image quality. An artifact prediction metric above a predefined limit for the whole-slide image may be interpreted as representing that the whole-slide image includes an artifact (e.g., blurry region, air bubble, tissue fold, pen mark, cracked slide). Similarly, a predicted image quality below a predefined limit for the whole-slide image may be interpreted as representing that the whole-slide image includes an artifact.

In some instances, a quality heat map generator 150 of the image-processing system 135 generates a quality heat map image using the local-pattern values from the texture characterizer 145. The quality heat map generator 150 may generate a quality heat map image for each tile and then stitch the tiles together to generate an output image that corresponds to the whole-slide image. The quality heat map image can include a color range (e.g., from blue to red) that represents the one or more artifact prediction metrics. Blue and green can represent high image quality, light yellow to medium yellow can represent medium image quality, and dark yellow to red can represent low image quality. Tiles that have a predicted medium or low image quality can correspond to tiles that are more likely than not to include at least part of an artifact. For blur, an artifact prediction metric can be a blur percentage that quantifies a predicted amount of blur for a region. A higher blur percentage can correspond to a higher predicted amount of blur for the region. For example, blue and green can represent in-focus regions, light yellow to medium yellow can represent soft-blur regions (e.g., a blur percentage up to 25%), and dark yellow to red can represent hard-blur regions (e.g., a blur percentage above 25%).

In some instances, an artifact characterizer 155 of the image-processing system 135 characterizes artifacts in the whole-slide image based on the one or more artifact prediction metrics. For example, particular values for the one or more artifact prediction metrics may correspond to a particular artifact. The artifact characterizer 155 can train and use a machine learning model (e.g., neural network, cluster model, decision tree, etc.) to characterize artifacts in whole-slide images. The artifact characterizer 155 can train the machine learning model by receiving quality heat map images with labels that identify artifact types. The artifact characterizer 155 can then receive the quality heat map image and use the trained machine learning model to characterize the whole-slide image based on the one or more artifact prediction metrics. In the aggregate, the artifact characterizer 155 may provide, for a set of whole-slide images, an analysis of artifact types across the set. For instance, the artifact characterizer 155 may provide an output that a given set of whole-slide images has air bubbles on a majority of the slides, or that the heat maps from the quality heat map generator 150 indicate artifacts in a majority of the slide images. In this way, outputs of the artifact characterizer 155 could prompt a re-scan, a check of the procedures taken to make the slides and images, a revisiting of the pricing or terms around the data collection, etc.

The image-processing system 135 can output the one or more artifact prediction metric(s) and/or the quality heat map image. The output of the one or more artifact prediction metric(s) can correspond to the whole-slide image or one or more of the tiles. The output can include a local presentation or a transmission (e.g., to user device 130).

In some instances, the image-processing system 135 may not automatically determine to discard or rescan some or all of the whole-slide image. Instead, the quality heat map image may be output along with an interface configured to receive an input from a user. The input can indicate whether an image, or a portion of the image, is to be discarded or a slide is to be rescanned. The interface may include tools, such as a box or pencil tool, to allow the user to identify a particular region that is to be discarded.

In some instances, the image-processing system 135 may perform subsequent digital pathology processing of at least part of the whole-slide image based on the one or more artifact prediction metrics. For example, the image-processing system 135 may determine one or more tiles, or portions of the tiles, of the whole-slide image to further process based on the one or more artifact prediction metrics associated with the set of tiles. To do this, the image-processing system 135 may determine tiles of the whole-slide image that include an image quality below a threshold (e.g., 50%) are to be further processed. The image quality for a tile may be determined by averaging the image quality of each pixel of the tile. The further processing may involve performing image processing on the tiles to sharpen the tiles. For example, a high pass filter or an unsharp mask may be applied to the tile. Boundary pixels of the tile may be sharpened less than central pixels to prevent an abrupt transition from the tile to a neighboring tile. Additionally or alternatively, the further processing may involve discarding the whole-slide image or excluding the tiles from feature-extraction operations for characterizing the whole-slide image. In some instances, regions within a tile may be processed or discarded without processing or discarding the whole tile. For example, the image-processing system 135 may determine regions of a tile that include an artifact prediction metric that exceeds a predefined limit. These regions may then be discarded or set to a mean value of the tile.

In some instances, the image-processing system 135 may determine a number of pixels of the whole-slide image that include a level of image quality below a predefined amount exceeds a predefined limit (e.g., greater than 20% of the pixels of the whole-slide image) based on the one or more artifact prediction metrics. The image-processing system 135 may discard the whole-slide image based on the number of pixels exceeding the predefined limit. The image-processing system 135 may additionally or alternatively generate a notification for the user device 130 or image-generation system 105 indicating the slice of specimen of the whole-slide image is to be rescanned to generate a new whole-slide image if the number of pixels exceeds the predefined limit. The image-processing system 135 may additionally automatically prompt the image-generation system 105 to rescan the whole-slide image if the number of pixels exceeds the predefined limit.

In some instances, the image-processing system 135 may determine whether each tile of the set of tiles corresponds to a particular artifact prediction metric that is greater than a predefined upper limit. For example, the image-processing system 135 can determine whether, with respect to a given tile, at least 50% of the regions within the tile are associated with an artifact prediction metric that indicates that it is more likely than not that the region depicts at least part of an artifact.

The image-processing system 135 can then further process the one or more tiles to characterize the slice of specimen. For example, additional algorithms may be applied to the one or more tiles to identify a presence and/or quantity of tumor cells in the slice of specimen.

Each component and/or system in FIG. 1 can include (for example) one or more computers, one or more servers, one or more processors, and/or one or more computer-readable media. In some instances, a single computing system (having one or more computers, one or more servers, one or more processors, and/or one or more computer-readable media) can include multiple components depicted in FIG. 1. For example, image-processing system 135 may include a single server and/or collection of servers that collectively implements functionality of all of preprocessor 140, texture characterizer 145, and quality heat map generator 150.

It will be appreciated that various alternative embodiments are contemplated. For example, image-processing system 135 need not include quality heat map generator 150 and/or need not generate a quality heat map image. Rather an annotated image (with annotations generated by texture characterizer 145) including the one or more artifact prediction metrics be output by image-processing system 135.

III. Methods

Figure 2:
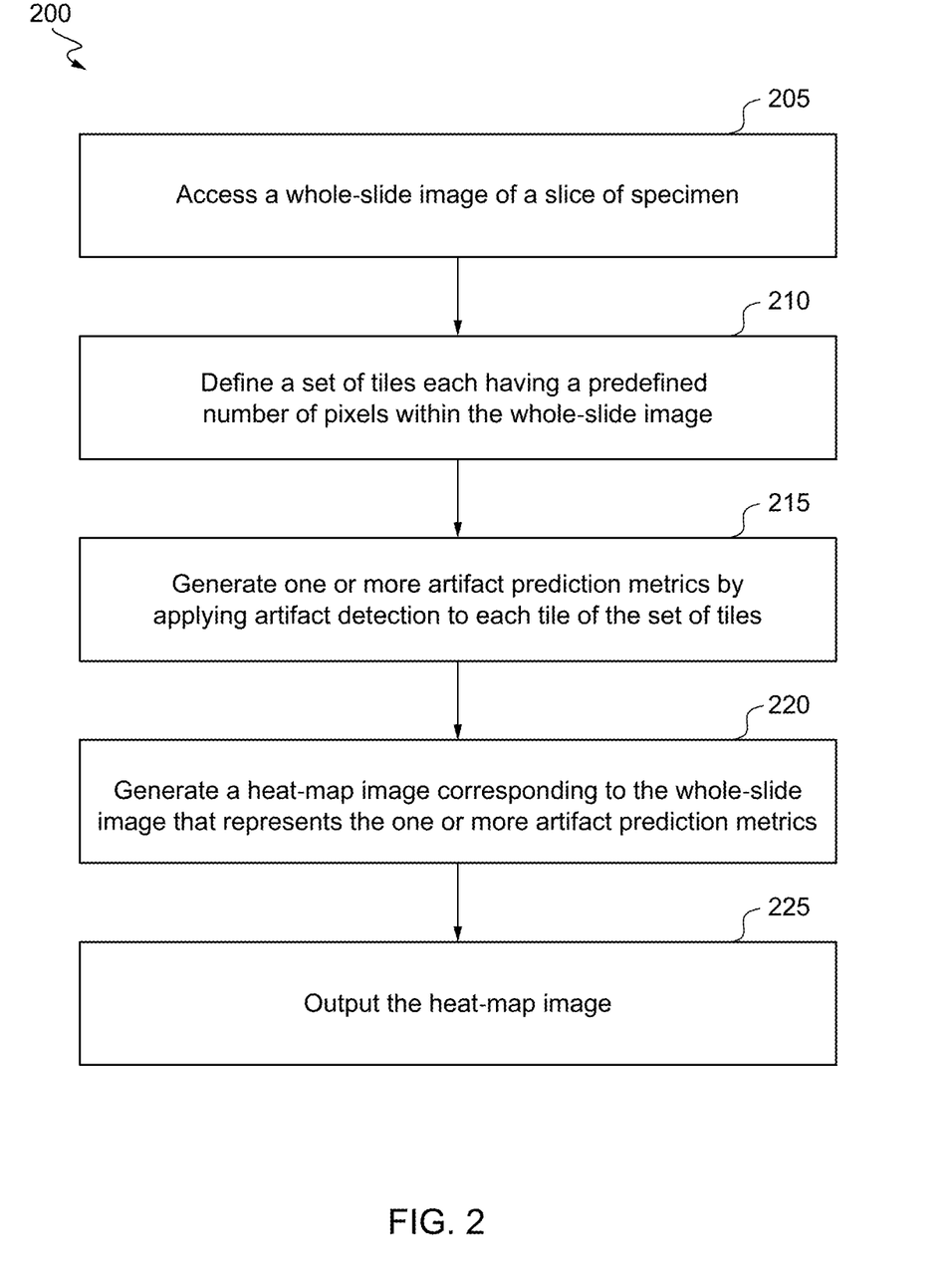
FIG. 2 illustrates a process for processing images using artifact detection according to some embodiments.

FIG. 2 illustrates a process 200 for processing images using artifact detection according to some embodiments. More specifically, digital pathology images can be processed to generate one or more artifact prediction metrics that characterize a level of image quality in the whole-slide image, which can then inform subsequent processing of the whole-slide image. At block 205, a whole-slide image may be accessed by an image-processing system (e.g., image-processing system 135). The whole-slide image can depict a slice of specimen. The whole-slide image may depict a stained section of a sample from a subject. In some instances, the whole-slide image may be preprocessed to be transformed into a grayscale image.

At block 210, a set of tiles may be defined within the whole-slide image. Each tile of the set of tiles can have a predefined size (e.g., 4×4 pixels). The set of tiles may be filtered into a subset of tiles. Each tile can be evaluated to determine whether it is to be included in the subset of tiles. A condition can be defined such that the tile is to be included in the subset if an amount of the tile that depicts the slice of specimen can exceeds a predefined threshold (e.g., 10%). Further processing may only be applied to the subset of tiles, thus reducing computation requirements by removing the tiles that do not satisfy the condition.

At block 215, one or more artifact prediction metrics may be generated for each tile of the set of tiles. Alternatively, one or more artifact prediction metrics may be generated for each tile in the subset of tiles.

The one or more artifact prediction metrics may be generated by a texture characterizer (e.g., texture characterizer 145). The one or more artifact prediction metrics can correspond to a predicted level of image quality of part or all of the whole-slide image and may be usable in identifying one or more of blur artifacts, tissue-fold artifacts, pen marks, air bubbles, or cracked slides in the whole-slide image. The artifact detection can involve a texture descriptor algorithm, such as an LBP algorithm that determines relative differences between intensities of center pixels and surrounding pixels to generate a feature data structure that is usable in determining the one or more artifact prediction metrics.

At block 220, a quality heat map image may be generated that corresponds to the whole-slide image by stitching each tile of the set of tiles together. The quality heat map image can be generated by a quality heat map generator (e.g., quality heat map generator 150). The quality heat map image can represent the one or more artifact prediction metrics. For example, the quality heat map may use a color range that represents the one or more artifact prediction metrics. A first color (e.g., blue) of the quality heat map can correspond to a high image quality, a second color (e.g., yellow) can correspond to a medium image quality, and a third color (red) can correspond to a low image quality. Colors in between these representative colors may correspond to interim image quality. One or more cutoffs in a color range may be identified as corresponding to cutoffs for different types of image quality.

At block 225, the quality heat map image may be output. Subsequent processing of some or all of the whole-slide image can be configured based on the quality heat map image. For example, tiles of the whole-slide image including artifact prediction metrics exceeding a predefined limit may be further processed to sharpen the tiles. Alternatively, the whole-slide image or portions of the whole-slide image may be discarded or rescanned if the number of pixels having an artifact prediction metric corresponding to a predicted level of image quality below a predefined limit exceeds a threshold. Tiles that include an artifact prediction metric that corresponds to a predicted level of image quality greater than a predefined amount for a number of pixels greater than a predefined limit may be further processed to determine one or more characteristics (e.g., presence, size, and/or quantity of tumor cells) of the slice of specimen.

Figure 3:
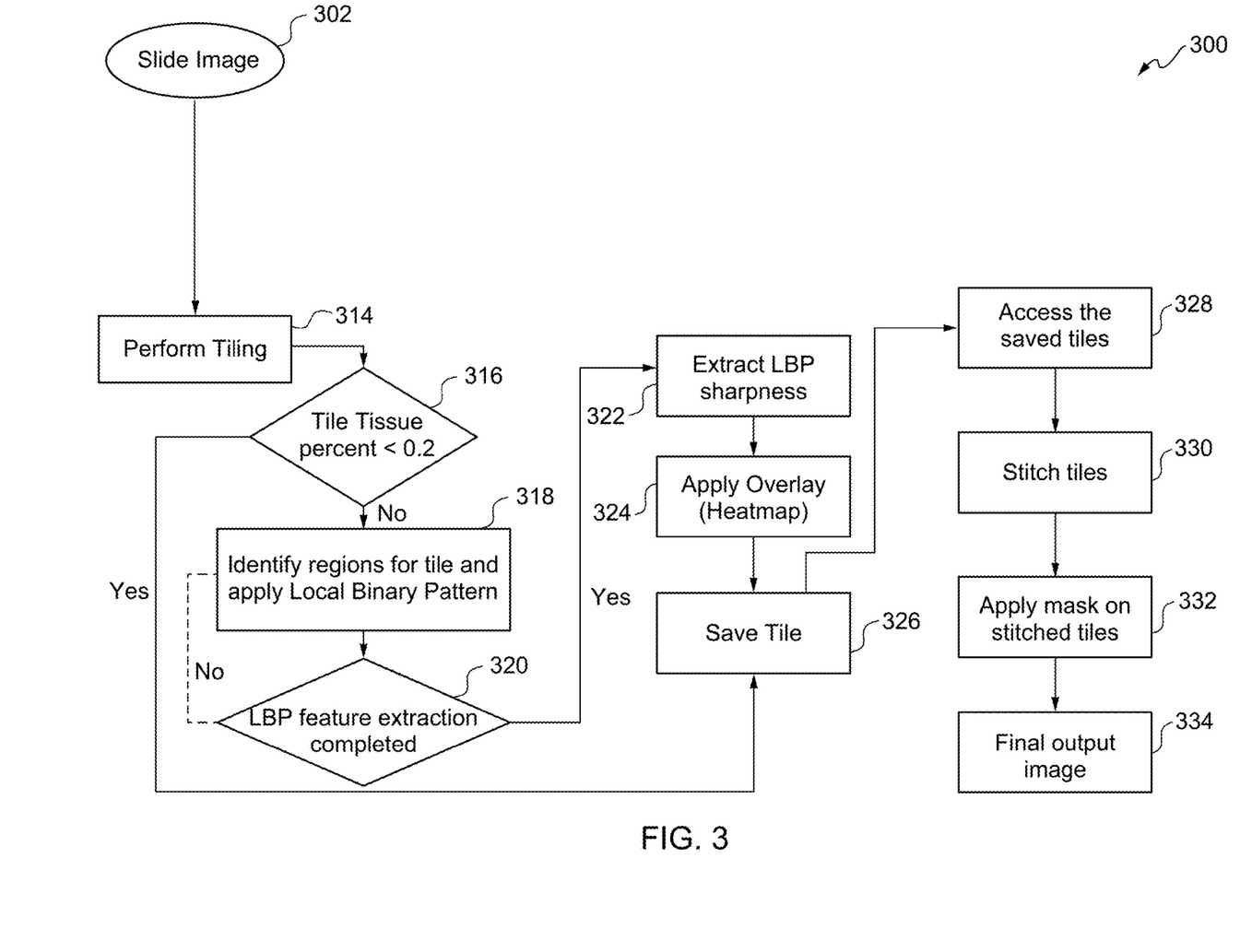
FIG. 3 illustrates another process for processing images using artifact detection according to some embodiments.

FIG. 3 illustrates another process 300 for processing images using artifact detection according to some embodiments. Process 300 may be performed subsequent to an image-generation system (e.g., image-generation system 105) generating a whole-slide image. Process 300 may be performed by part or all of an image-processing system (e.g., image-processing system 135). At block 302, a digital pathology slide image may be accessed. The slide image can be a whole-slide image of a slide that includes a slice of a specimen.

At block 314, tiling may be performed for the whole-slide image. Each of the tiles can include a predefined number of pixels. The tiles may not overlap, such that each pixel of the whole-slide image is included in only one tile.

At block 316, a condition can be evaluated for each tile of the whole-slide image. The condition can be defined as an amount of the tile depicting the slice of specimen being below 20%. Tiles with an amount less than 20% that depicts the slice of specimen can proceed to being saved at block 326. Tiles with an amount more than 20% that depicts the slice of specimen can proceed to block 318.

At block 318, regions are defined within each tile of the whole-slide image. Each region includes a center pixel and surrounding pixels. For example, each region may be 3×3 pixels. An LBP algorithm is then applied to each tile. The LBP algorithm can have predefined hyperparameters for a number of surrounding points of the center pixel that are to be considered and a radius from the center pixel at which the surrounding points are to be positioned. The LBP algorithm can generate a local-pattern value for each region that represents relative differences between intensities of pixels within the region.

At block 320, it can be determined whether LBP feature extraction is completed. LBP feature extraction can be completed when the LBP algorithm has generated local-pattern values for each region of each tile remaining after block 316. If it is determined LBP feature extraction is not complete, the process 300 returns to block 318. Otherwise, the process 300 proceeds to block 322.

At block 322, an LBP sharpness may be extracted for the tiles. The LBP sharpness can correspond to the local-pattern values generated by the LBP algorithm. The local-pattern values can be used to determine artifact prediction metrics for the tiles. The artifact prediction metrics can represent a predicted image quality for part or all of the tiles. The predicted image quality can correspond to a predicted presence of a depiction of an artifact in the whole-slide image. For example, a lower image quality for a region can correspond to a higher likelihood of a depiction of an artifact in the region.

At block 324, quality heat map may be overlaid on the tiles. The quality heat map may use a color range that represents the one or more artifact prediction metrics. A first color (e.g., blue) of the quality heat map can correspond to a high image quality, a second color (e.g., yellow) can correspond to a medium image quality, and a third color (red) can correspond to a low image quality. Additionally, colors that correspond to a medium image quality and a low image quality can also correspond to a higher likelihood of a depiction of an artifact.

At block 326, the tiles that do not satisfy the condition of block 316 and the tiles with the overlaid quality heat map may be saved. The tiles may be saved in a database that includes tiles of other whole-slide images, and therefore each tile can be associated with a corresponding whole-slide image.

At block 328, the saved tiles may be accessed. After the tiles from block 316 and the tiles from block 324 are saved, the tiles may then be accessed. Accessing the tiles can involve retrieving each tile associated with the whole-slide image.

At block 330, the tiles may be stitched together to form an image that corresponds to the whole-slide image. A positioning of each tile within the whole-slide image may be stored for each tile to ensure that the stitching results in an image that corresponds to the original whole-slide image.

At block 332, a mask may be applied to the stitched tiles. The mask can hide the tiles that do not satisfy the condition in block 316. Thus, one embodiment may entail preserving only portions of the whole-slide image depicting a significant amount of the slice of specimen for future operations or prediction model/machine learning training.

At block 334, a final image may be output. The final image can be a quality heat map image that represents the artifact prediction metrics. Further processing may be initiated based on the final image. For example, tiles may be discarded based on the tiles including an artifact prediction metric that corresponds to a high likelihood of the tile depicting an artifact. Tiles that are not discarded may be analyzed for areas of interest (e.g., tumor cells). Additionally or alternatively, the whole-slide image may be discarded or rescanned if the whole-slide image includes artifact prediction metrics that correspond to a high likelihood of the whole-slide image depicting an artifact.

IV. Examples

IV.A. Input and Output Images

FIGS. 4A-4E illustrate exemplary input images and output images of the network 100. The top images in each of 4A-4C depict a whole slide. The bottom images depict a magnified part of the whole slide. The left images depict the original pixel intensities, while the right images depict a color map representing artifact prediction metrics. The bottom images further include a box that indicates which regions were predicted to be depicting at least part of an artifact. FIGS. 4A-4E correspond to images that depict particular artifacts. For example, the top-left image in FIG. 4A includes a depiction of a blur artifact, the top-left image in FIG. 4B includes a depiction of a slide with a tissue-folding artifact, the top-left image in FIG. 4C includes a depiction of a slide with an air-bubble artifact, the left image in FIG. 4D includes a depiction of a slide with a crack artifact, and the left image in FIG. 4E includes a depiction of a slide with a pen-mark artifact.

Figure 4A:
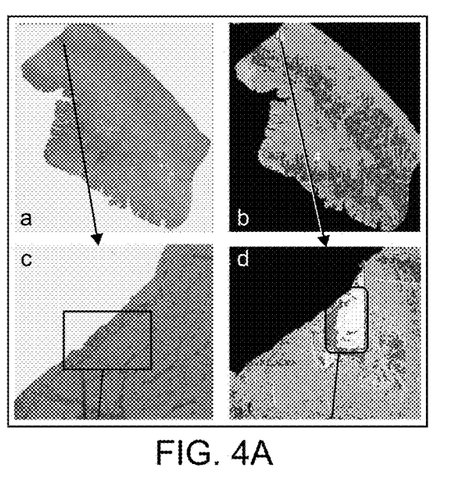
FIGS. 4A-4E show exemplary input images and output images of the interaction system according to some embodiments.
Figure 4B:
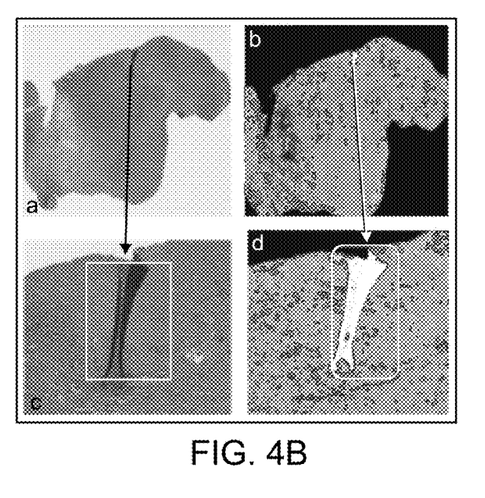
Figure 4C:
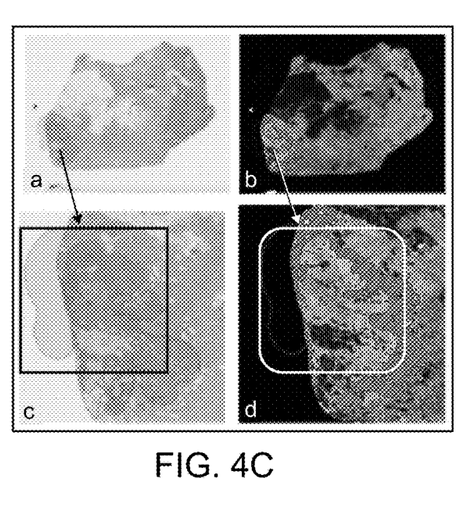
Figure 4D:
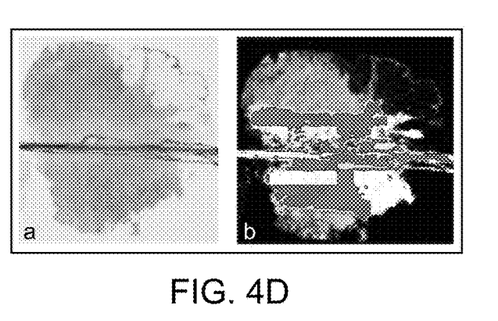
Figure 4E:
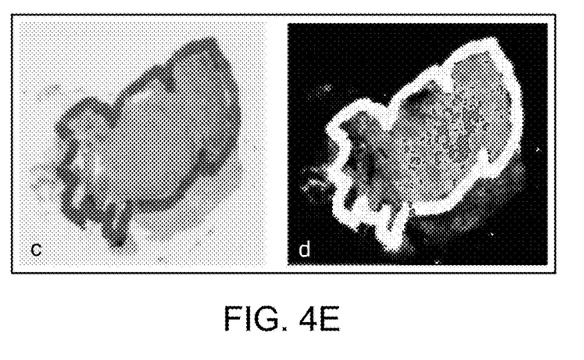

Lighter colors in the right images of FIGS. 4A-4B and 4E, and darker colors in the right images of FIGS. 4C-4D, correspond to predictions that an artifact is present. Thus, pixels in white in the right images of FIGS. 4A-4B and 4E and pixels in the gray region textured with diagonal lines in the right images of FIGS. 4C-4D correspond to predictions that the pixel is depicting a type of artifact. In the top-right image in FIG. 4A, pixels in the upper-left portion of the slide and in the lower-middle portion of the slide are white, corresponding to a prediction of an artifact in these regions. In the top-right image in FIG. 4B, an upper-middle portion of the slide is depicted in white, corresponding to a prediction of an artifact in this region. In the bottom-right image in FIG. 4C, pixels in a bottom-left portion of the slide are depicted in gray textured with diagonal lines, corresponding to a prediction of an artifact in this region. In the right image in FIG. 4D, significant portions are depicted in gray textured with diagonal lines, corresponding to a prediction of an artifact in these regions. In the right images in FIG. 4E, significant portions are depicted in white, corresponding to a prediction of an artifact in these regions.

IV.B. Transforming an Input Image to a Quality Heat Map Image

Figure 5:
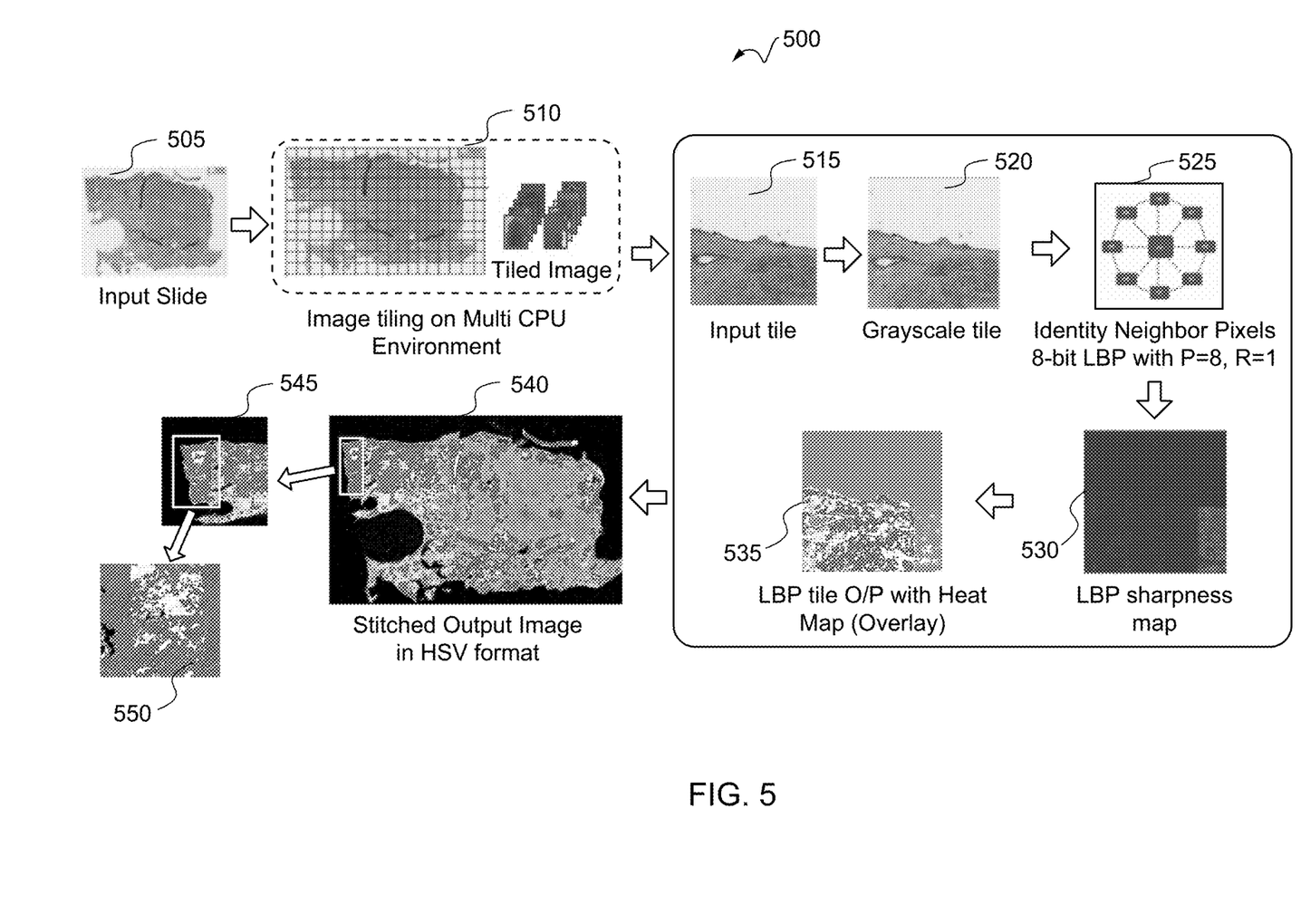
FIG. 5 illustrates an example of transforming a digital pathology image into a quality heat map image according to some embodiments.

FIG. 5 illustrates an example 500 that exemplifies how a digital pathology image is transformed into a quality heat map image representing digital pathology metrics according to some embodiments. The example 500 may be performed by some or all of the network 100.

In image 505, a whole-slide image was accessed by an image-processing system (e.g., image-processing system 135). The whole-slide image was generated by an image-generation system (e.g., image-generation system 105) and depicts a slice of specimen. Although image 505 is depicted in grayscale in FIG. 5, the whole-slide image may alternatively be a color image.

In step 510, the whole-slide image was segmented into tiles, each of a predefined size (e.g., 4×4 pixels). Each of the tiles was analyzed to determine an amount of the tile that depicts the slice of specimen. In examples in which the whole-slide image is a color image, the tiles can also be in color. A color (or value) of portions of the whole-slide image that do not include the slice of specimen was determined. For example, background of the whole-slide image, and thus the portion that does not include the slice of specimen, was determined to be white. An amount of the tile having the particular color (or corresponding value) was determined. Tiles that do not include an amount greater than a threshold (e.g., 10%) were filtered out to reduce computation requirements. Each of the remaining tiles, including image 515, which shows an input image tile with greater than 10% of the slide depicting the slice of specimen, were then converted to grayscale (if the tiles were in color), as shown in image 520. The segmenting, filtering, and grayscale conversion may all be performed by a whole-slide image preprocessor (e.g., preprocessor 140).

The grayscale tile may be input to a texture characterizer (e.g., texture characterizer 145). A set of regions was defined within the tile. Each region included a center pixel and multiple surrounding pixels. For example, each of the set of regions was 3×3 pixel squares. Each center pixel therefore included eight surrounding pixels. Image 525 illustrates a specification that defines a region, which has a center pixel and eight surrounding pixel points, each a radius of one away from the center.

In image 530, local-pattern values were generated for each region. The local-pattern values can be binary or decimal numbers determined by comparing intensities of the surrounding pixels of a region to the intensity of the center pixel of the region. The local-pattern values were stored in a feature data structure.

In image 535, the local-pattern values of the feature data structure were used by a quality heat map generator (e.g., quality heat map generator 150) to generate a quality heat map image of the tile. The quality heat map can use an intensity range or color range that represents a range of artifact prediction metrics, such as a blur percentage. In FIG. 5, darker intensities in a grayscale color range can represent a higher blur percentage. In other examples involving an RGB color range, blue and green may represent a low blur percentage, yellow can represent a medium blur percentage, and orange and red can represent a high blur percentage. Once a quality heat map image is generated for each of the tiles, the tiles can then be stitched back together to generate an output quality heat map image, as shown in image 540.

Images 545 and 550 illustrate zoomed-in areas of different magnifications of the output quality heat map image that include out-of-focus pixels, represented by dark gray. In an RGB color range, the out-of-focus pixels may be represented by yellow and orange. The image-processing system can determine whether the areas including a level of image quality below a predefined limit exceeds a threshold. The image-processing system can then configure subsequent digital pathology processing, such as further processing on the tiles with a level of image quality below the threshold, rescanning the whole-slide image, or discarding the tiles with a low image quality and/or the whole-slide image.

Figure 6:
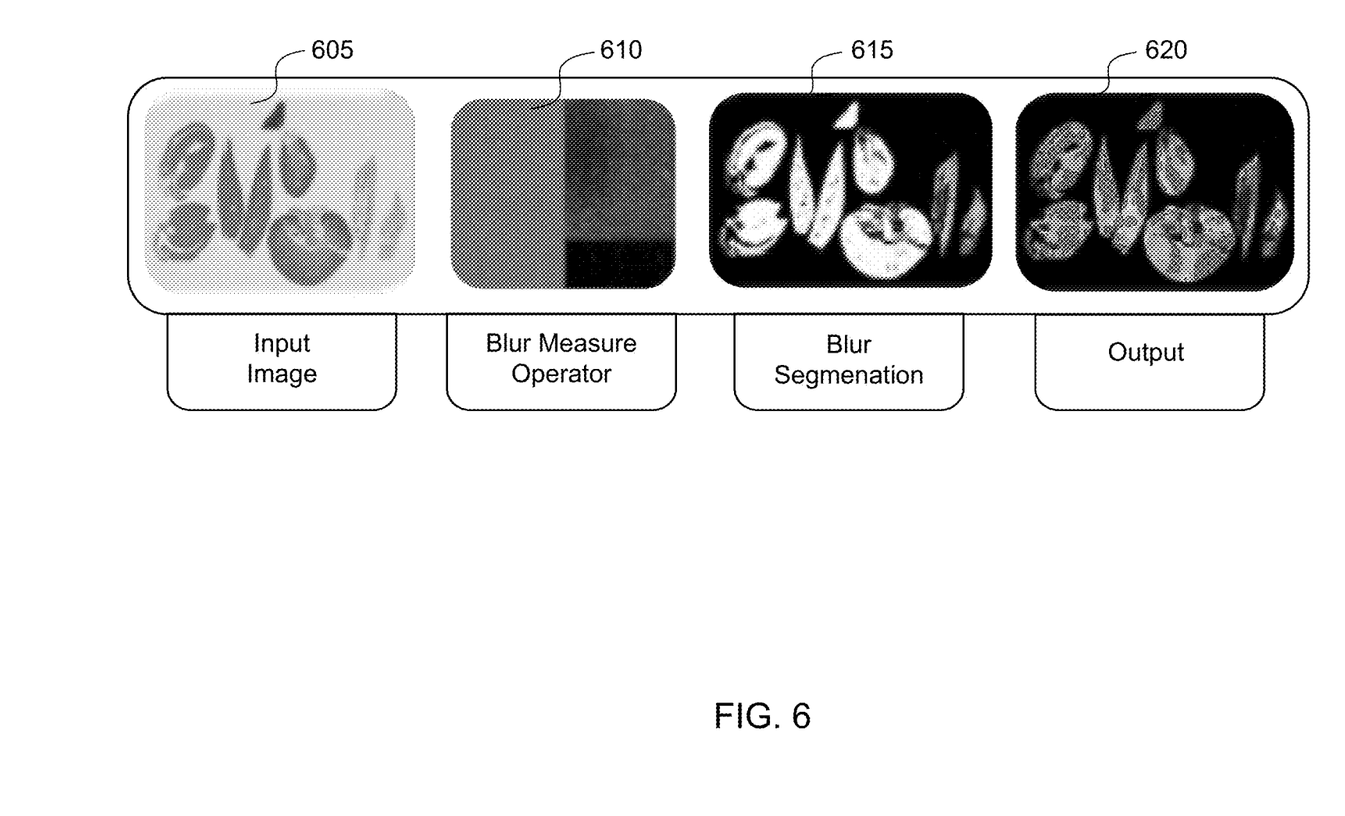
FIG. 6 illustrates another example of transforming a digital pathology image into a quality heat map image according to some embodiments.

FIG. 6 illustrates another example of transforming a digital pathology image into a quality heat map image according to some embodiments. Image 605 is an image that was input to an image-processing system. Image 605 includes a slice of specimen. Image 605 was segmented into tiles and a blur measure operator 610 (e.g., an LBP algorithm, a Laplacian operator, a Gaussian operator, etc.) was applied to image 605. Image 615 was generated by applying the blur measure operator 610 to image 605. Image 615 shows blur segmentation, with different grayscale values representing different predicted levels of blur in image 615. A quality heat map was applied to image 615 to generate image 620, which represents artifact prediction metrics calculated from the blur measure operator 610. In FIG. 6, lighter intensities represent regions with a low likelihood of a depiction of an artifact, and darker intensities represent regions that are more likely than not to include a depiction of an artifact. A far-right portion of image 620 is dark gray, corresponding to a higher likelihood that this region includes a depiction of an artifact. In other examples, such as a quality heat map that uses an RGB color range, blue and green can represent regions with a low likelihood of a depiction of an artifact, and yellow and orange can represent regions that are more likely than not to include a depiction of an artifact.

V. Advantages

The proposed method presents a number of advantages for artifact detection in digital pathology images. For example, the quality heat map can allow for a whole-slide image to be quickly identified as including an artifact or not. Additionally, the quality heat map reduces a need for human operators to analyze each whole-slide image to identify artifacts. This process for human operators is often time consuming and subject to inaccuracies, so the quality heat map introduces a fast, consistent process for identifying artifacts and triggering next steps. For example, determinations for a quality heat map image can result in an automated rescanning of the corresponding slide, whereas additional steps of locating the slide and initiating rescanning are needed when a human operator determines an image includes an artifact. Additionally, the quality heat map allows additional processing to be applied to the whole-slide image without needing to rescan the image. For example, if the quality heat map image indicates only a portion of a whole-slide image includes a depiction of an artifact, those portions may be sharpened or discarded without discarding the whole-slide image, rescanning the slide, or affecting the whole-slide image by sharpening all of the whole-slide image. Even if artifact prediction metrics are not output along with the quality heat map image, the quality heat map image is usable by a human operator to visualize artifacts, which may be faster than the human operator visualizing artifacts in the whole-slide image.

VI. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

VII. Example Embodiments

As used below, any reference to a series of examples is to be understood as a reference to each of those examples disjunctively (e.g., "Examples 1-4" is to be understood as "Examples 1, 2, 3, or 4").

Example 1 is a computer-implemented method comprising: accessing a whole-slide image depicting a slice of specimen; defining a set of tiles within at least part of the whole-slide image; generating one or more artifact prediction metrics by applying artifact detection to each tile of the set of tiles, wherein each of the one or more artifact prediction metrics corresponds to a predicted presence of an artifact in part or all of the whole-slide image; generating a quality heat map image corresponding to the whole-slide image, wherein the quality heat map image is based on the one or more artifact prediction metrics; and outputting the quality heat map image.

Example 2 is the computer-implemented method of any of the preceding or subsequent examples, wherein a color range used by the quality heat map represents the one or more artifact prediction metrics.

Example 3 is the computer-implemented method of any of the preceding or subsequent examples, further comprising determining one or more tiles of the set of tiles to further process based on the one or more artifact prediction metrics associated with the set of tiles.

Example 4 is the computer-implemented method of any of the preceding or subsequent examples, further comprising: determining a particular artifact prediction metric of the one or more artifact prediction metrics corresponds to a predicted level of image quality below a predefined amount; determining a number of pixels of the whole-slide image that include the particular artifact prediction metric exceeds a predefined limit; and discarding the whole-slide image.

Example 5 is the computer-implemented method of any of the preceding or subsequent examples, further comprising: determining a particular artifact prediction metric of the one or more artifact prediction metrics corresponds to a predicted level of image quality below a predefined amount; determining a number of pixels of the whole-slide image that include the particular artifact prediction metric exceeds a predefined limit; and rescanning the whole-slide image.

Example 6 is the computer-implemented method of any of the preceding or subsequent examples, further comprising: determining a particular artifact prediction metric of the one or more artifact prediction metrics corresponds to a predicted level of image quality greater than a predefined amount; determining a number of pixels of one or more tiles of the set of tiles that include the particular artifact prediction metric exceeds a predefined limit; and further processing the one or more tiles of the set of tiles to determine one or more characteristics of the slice of specimen.

Example 7 is the computer-implemented method of any of the preceding or subsequent examples, wherein applying artifact detection comprises: generating a feature data structure by processing the whole-slide image using a texture descriptor algorithm by: defining a set of regions within at least part of the whole-slide image, wherein each region of the set of regions includes a center pixel and multiple surrounding pixels; generating, for each region of the set of regions, a local-pattern value that represents relative differences between intensities of pixels within the region; and generating the one or more artifact prediction metrics for the whole-slide image based on the local-pattern values.

Example 8 is the computer-implemented method of any of the preceding or subsequent examples, wherein generating the local-pattern value comprises: generating a pixel-comparison value for each surrounding pixel of the multiple surrounding pixels in the region that indicates whether an intensity of the surrounding pixel is greater than an intensity of the center pixel in the region; and generating a binary number for the region based on the pixel-comparison values.

Example 9 is the computer-implemented method of any of the preceding or subsequent examples, wherein the texture descriptor algorithm comprises a local binary pattern (LBP) algorithm.

Example 10 is the computer-implemented method of any of the preceding or subsequent examples, further comprising, prior to generating the feature data structure: determining, for each tile of the set of tiles, an amount of the tile that depicts at least some of the slice of specimen; determining, for each tile of the set of tiles, whether the amount of the tile exceeds a predefined threshold; filtering tiles of the set of tiles for which the amount of the tile exceeds the predefined threshold into a subset of tiles; and generating the feature data structure from the subset of tiles.

Example 11 is the computer-implemented method of any of the preceding or subsequent examples, wherein the whole-slide image includes a grayscale image.

Example 12 is the computer-implemented method of any of the preceding or subsequent examples, wherein the one or more artifact prediction metrics correspond to a depiction of a blur artifact, an air-bubble artifact, a pen-mark artifact, and/or a tissue-folding artifact in the whole-slide image.

Example 13 is the computer-implemented method of any of the preceding or subsequent examples, wherein each tile of the set of tiles includes a predefined number of pixels.

Example 14 is the computer-implemented method of any of the preceding or subsequent examples, wherein generating the quality heat map image comprises stitching each tile of the set of tiles together.

Example 15 is a system comprising: one or more data processors; and a non-transitory computer readable storage medium containing instructions which, when executed on the one or more data processors, cause the one or more data processors to perform part or all of one or more methods disclosed herein.

Example 16 is a computer-program product tangibly embodied in a non-transitory machine-readable storage medium, including instructions configured to cause one or more data processors to perform part or all of one or more methods disclosed herein.

What is claimed is:

1. A computer-implemented method comprising:
accessing a whole-slide image depicting a slice of specimen;
separating the whole-slide image to obtain a set of tiles;
filtering the set of tiles to obtain a subset of tiles, wherein the filtering comprises:
determining an amount of each tile of the set of tiles that depicts at least a portion of the slice of specimen; and
removing tiles from the set of tiles that do not meet a predefined threshold;
generating a feature data structure by processing the subset of tiles using a texture descriptor algorithm, wherein the generating comprises:
defining a set of regions within the subset of tiles, wherein each region of the set of regions includes a center pixel and multiple surrounding pixels;
generating, for each region of the set of regions, a local-pattern value for the center pixel that represents relative differences between intensities of the multiple surrounding pixels and the center pixel within the region; and
storing the local-pattern values in the feature data structure, wherein the feature data structure is of a same size as the whole-slide image or the subset of tiles;
generating one or more artifact prediction metrics for each tile based on the local-pattern values for pixels within the tile by applying artifact detection to each tile of the subset of tiles, wherein each of the one or more artifact prediction metrics corresponds to a predicted presence of an artifact in the corresponding tile;
generating a quality heat map image corresponding to the whole-slide image, wherein the quality heat map image is based on the one or more artifact prediction metrics and the feature data structure; and
outputting the quality heat map image.

2. The computer-implemented method of claim 1, wherein a color range used by the quality heat map represents the one or more artifact prediction metrics.

3. The computer-implemented method of claim 1, further comprising determining one or more tiles of the set of tiles to further process based on the one or more artifact prediction metrics associated with the set of tiles.

4. The computer-implemented method of claim 1, further comprising:
determining a particular artifact prediction metric of the one or more artifact prediction metrics corresponds to a predicted level of image quality below a predefined amount;
determining a number of pixels of the whole-slide image that include the particular artifact prediction metric exceeds a predefined limit; and
discarding the whole-slide image.

5. The computer-implemented method of claim 1, further comprising:
determining a particular artifact prediction metric of the one or more artifact prediction metrics corresponds to a predicted level of image quality below a predefined amount;
determining a number of pixels of the whole-slide image that include the particular artifact prediction metric exceeds a predefined limit; and
rescanning the whole-slide image.

6. The computer-implemented method of claim 1, further comprising:
determining a particular artifact prediction metric of the one or more artifact prediction metrics corresponds to a predicted level of image quality greater than a predefined amount;
determining a number of pixels of one or more tiles of the set of tiles that include the particular artifact prediction metric exceeds a predefined limit; and
further processing the one or more tiles of the set of tiles to determine one or more characteristics of the slice of specimen.

7. The computer-implemented method of claim 1, wherein generating the local-pattern value comprises:
generating a pixel-comparison value for each surrounding pixel of the multiple surrounding pixels in the region that indicates whether an intensity of the surrounding pixel is greater than an intensity of the center pixel in the region; and
generating a binary number for the region based on the pixel-comparison values.

8. The computer-implemented method of claim 1, wherein the texture descriptor algorithm comprises a local binary pattern (LBP) algorithm.

9. The computer-implemented method of claim 1, wherein the whole-slide image includes a grayscale image.

10. The computer-implemented method of claim 1, wherein the one or more artifact prediction metrics correspond to a depiction of a blur artifact, and at least one of the following: an air-bubble artifact, a pen-mark artifact, and/or a tissue-folding artifact in the whole-slide image.

11. The computer-implemented method of claim 1, wherein each tile of the set of tiles includes a predefined number of pixels.

12. The computer-implemented method of claim 1, wherein the predetermined threshold is at least 10% of pixels depicting a portion of the slice of specimen.

13. A system comprising:
one or more data processors; and
a non-transitory computer readable storage medium containing instructions which, when executed on the one or more data processors, cause the one or more data processors to:
access a whole-slide image depicting a slice of specimen;
separate the whole-slide image to obtain a set of tiles;
filter the set of tiles to obtain a subset of tiles, wherein the filtering comprises:
determining an amount of each tile of the set of tiles that depicts at least a portion of the slice of specimen; and
removing tiles from the set of tiles that do not meet a predefined threshold;
generate a feature data structure by processing the subset of tiles using a texture descriptor algorithm, wherein the generating comprises:
defining a set of regions within the subset of tiles, wherein each region of the set of regions includes a center pixel and multiple surrounding pixels;
generating, for each region of the set of regions, a local-pattern value for the center pixel that represents relative differences between intensities of the multiple surrounding pixels and the center pixel within the region; and
storing the local-pattern values in the feature data structure, wherein the feature data structure is of a same size as the whole-slide image or the subset of tiles;

generate one or more artifact prediction metrics for each tile based on the local- pattern values for pixels within the tile by applying artifact detection to each tile of the subset of tiles, wherein each of the one or more artifact prediction metrics corresponds to a predicted presence of an artifact in the corresponding tile;

generate a quality heat map image corresponding to the whole-slide image, wherein the quality heat map image is based on the one or more artifact prediction metrics and the feature data structure; and output the quality heat map image.

14. A computer-program product tangibly embodied in a non- transitory machine-readable storage medium, including instructions configured to cause one or more data processors to:

access a whole-slide image depicting a slice of specimen;

separate the whole-slide image to obtain a set of tiles;

filter the set of tiles to obtain a subset of tiles, wherein the filtering comprises:

determining an amount of each tile of the set of tiles that depicts at least a portion of the slice of specimen; and removing tiles from the set of tiles that do not meet a predefined threshold;

generate a feature data structure by processing the subset of tiles using a texture descriptor algorithm, wherein the generating comprises:

defining a set of regions within the subset of tiles, wherein each region of the set of regions includes a center pixel and multiple surrounding pixels;

generating, for each region of the set of regions, a local-pattern value for the center pixel that represents relative differences between intensities of the multiple surrounding pixels and the center pixel within the region; and storing the local-pattern values in the feature data structure, wherein the feature data structure is of a same size as the whole-slide image or the subset of tiles;

generate one or more artifact prediction metrics for each tile based on the local-pattern values for pixels within the tile by applying artifact detection to each tile of the subset of tiles, wherein each of the one or more artifact prediction metrics corresponds to a predicted presence of an artifact in the corresponding tile;

generate a quality heat map image corresponding to the whole-slide image, wherein the quality heat map image is based on the one or more artifact prediction metrics and the feature data structure; and output the quality heat map image.

15. The system of claim 13, wherein the instructions further cause the one or more data processors to:

determine a particular artifact prediction metric of the one or more artifact prediction metrics corresponds to a predicted level of image quality below a predefined amount;

determine a number of pixels of the whole-slide image that include the particular artifact prediction metric exceeds a predefined limit; and discard the whole-slide image.

16. The system of claim 13, wherein the instructions further cause the one or more data processors to:

determine a particular artifact prediction metric of the one or more artifact prediction metrics corresponds to a predicted level of image quality below a predefined amount;

determine a number of pixels of the whole-slide image that include the particular artifact prediction metric exceeds a predefined limit; and rescan the whole-slide image.

17. The system of claim 13, wherein the texture descriptor algorithm comprises a local binary pattern (LBP) algorithm.

18. The computer-program product of claim 14, wherein the instructions are further configured to cause the one or more data processors to:

determine a particular artifact prediction metric of the one or more artifact prediction metrics corresponds to a predicted level of image quality below a predefined amount;

determine a number of pixels of the whole-slide image that include the particular artifact prediction metric exceeds a predefined limit; and discard the whole-slide image.

19. The computer-program product of claim 14, wherein the instructions are further configured to cause the one or more data processors to:

determine a particular artifact prediction metric of the one or more artifact prediction metrics corresponds to a predicted level of image quality below a predefined amount;

determine a number of pixels of the whole-slide image that include the particular artifact prediction metric exceeds a predefined limit; and rescan the whole-slide image.

20. The computer-program product of claim 14, wherein the texture descriptor algorithm comprises a local binary pattern (LBP) algorithm.

* * * * *